US011264728B1

(12) United States Patent
Bringuier et al.

(10) Patent No.: US 11,264,728 B1
(45) Date of Patent: Mar. 1, 2022

(54) CROSS-POLARIZATION ANTENNA FILTER

(71) Applicant: General Atomics Aeronautical Systems, Inc., Poway, CA (US)

(72) Inventors: Jonathan Neil Bringuier, Carlsbad, CA (US); John D. Fanelle, Del Mar, CA (US)

(73) Assignee: General Atomics Aeronautical Systems, Inc., Poway, CA (US)

( * ) Notice: Subject to any disclaimer, the term of this patent is extended or adjusted under 35 U.S.C. 154(b) by 226 days.

(21) Appl. No.: 16/358,667

(22) Filed: Mar. 19, 2019

(51) Int. Cl.
*H01Q 19/19* (2006.01)
*H01Q 19/02* (2006.01)
*H04B 7/0456* (2017.01)

(52) U.S. Cl.
CPC ......... *H01Q 19/028* (2013.01); *H01Q 19/192* (2013.01); *H04B 7/0469* (2013.01)

(58) Field of Classification Search
CPC .. H01Q 19/028; H01Q 19/192; H01Q 15/145; H04B 7/0469
See application file for complete search history.

(56) References Cited

U.S. PATENT DOCUMENTS

| 3,119,109 A | 1/1964 | Miller et al. | |
| 4,701,765 A * | 10/1987 | Arduini | H01Q 25/001 343/781 CA |
| 2020/0212586 A1 * | 7/2020 | Lu | H01Q 15/0026 |

* cited by examiner

*Primary Examiner* — Awat M Salih

(57) ABSTRACT

Disclosed are devices and methods for selecting, at an antenna reflector, electromagnetic waves with a certain polarization and frequency and rejecting electromagnetic waves with different polarizations and/or frequencies. In one aspect, a directional antenna includes a shaped reflector surface with a series of conforming layers attached to the surface. The layers include a reflecting layer that causes reflection of electromagnetic waves at a specific frequency and polarization. Underneath the reflecting layer is a frequency selective surface (FSS) layer that absorbs electromagnetic waves not at the specific frequency or polarization which pass through the reflecting layer. Underneath the absorbing layer is a conductive layer.

19 Claims, 10 Drawing Sheets

CROSS-POLARIZATION ANTENNA FILTER

TECHNICAL FIELD

The present disclosure relates to antennas and antenna filters to remove unwanted signals.

BACKGROUND

Radar and communications devices require an antenna. The selection and design of the antenna is important to the performance of the corresponding radar or communications device. For example, an antenna can provide spatial filtering by only allowing signals within a predetermined solid angle to be transmitted or received, or frequency filtering by providing gain within a range of frequencies. New devices and techniques are needed to improve the performance and efficiency, and to reduce the cost of radar and communications antennas.

SUMMARY

This patent document discloses antenna systems, methods, structures, and devices for selectively reflecting co-polarized electromagnetic waves and absorbing cross-polarized electromagnetic waves. In one aspect, a polarization selective antenna reflector apparatus is disclosed. The apparatus includes a reflecting layer structured to reflect incident electromagnetic waves with a first polarization at a selected frequency. The apparatus further includes an absorbing layer structured to form a frequency selective surface to absorb electromagnetic energy at the selected frequency that passes through the reflecting layer with polarizations different from the first polarization. The apparatus further includes a conducting layer structured to form a shape, wherein the absorbing layer and the reflecting layer conform to the shape.

In another aspect, a radar antenna apparatus is disclosed. The apparatus includes a reflecting layer structured to reflect electromagnetic waves received from a radar target having a first polarization at a selected frequency. The apparatus further includes an absorbing layer structured to form a frequency selective surface to absorb electromagnetic waves at the selected frequency that pass through the reflecting layer. The apparatus further includes a support structure having a three-dimensional shape and a conductive surface, wherein the reflecting layer and the absorbing layer conform to the support structure. The apparatus further includes a feed horn positioned to supply a transmit signal to the radar antenna that is transmitted toward the radar target and to receive a receive signal reflected from the radar target.

The following features may be included in various combinations. The reflecting layer may include a metal layer formed into a first pattern selected to reflect electromagnetic waves with the first polarization at the selected frequency. The absorbing layer may be a frequency selective surface. The shape may be parabolic in one or two dimensions. The first polarization may be a vertical polarization. A first dielectric layer may lie between the reflecting layer and the absorbing layer. A second dielectric layer may lie between the absorbing layer and the conducting layer. The first dielectric layer and the second dielectric layer may include Tencate EX-1515 and the reflecting layer includes nickel chromium.

In another aspect a method of filtering electromagnetic signals is disclosed. The method includes reflecting electromagnetic waves with a first polarization at a selected frequency. the method further includes absorbing electromagnetic energy at the selected frequency with a polarization different from the first polarization. The method further includes absorbing electromagnetic energy at frequencies other than the selected frequency.

The following features may be included in various combinations. The reflecting may be performed by a reflecting layer structured to reflect electromagnetic waves received from a radar target having a first polarization at a selected frequency. The absorbing the electromagnetic energy at the selected frequency with a polarization different from the first polarization and the absorbing the electromagnetic energy at frequencies other than the selected frequency may be performed by an absorbing layer structured to form a frequency selective surface. The reflecting layer may include a metal layer formed into a first pattern selected to reflect electromagnetic waves with the first polarization at the selected frequency.

The above and other aspects and their implementations are described in greater detail in the drawings, the description and the claims.

DETAILED DESCRIPTION

Figure 1A:
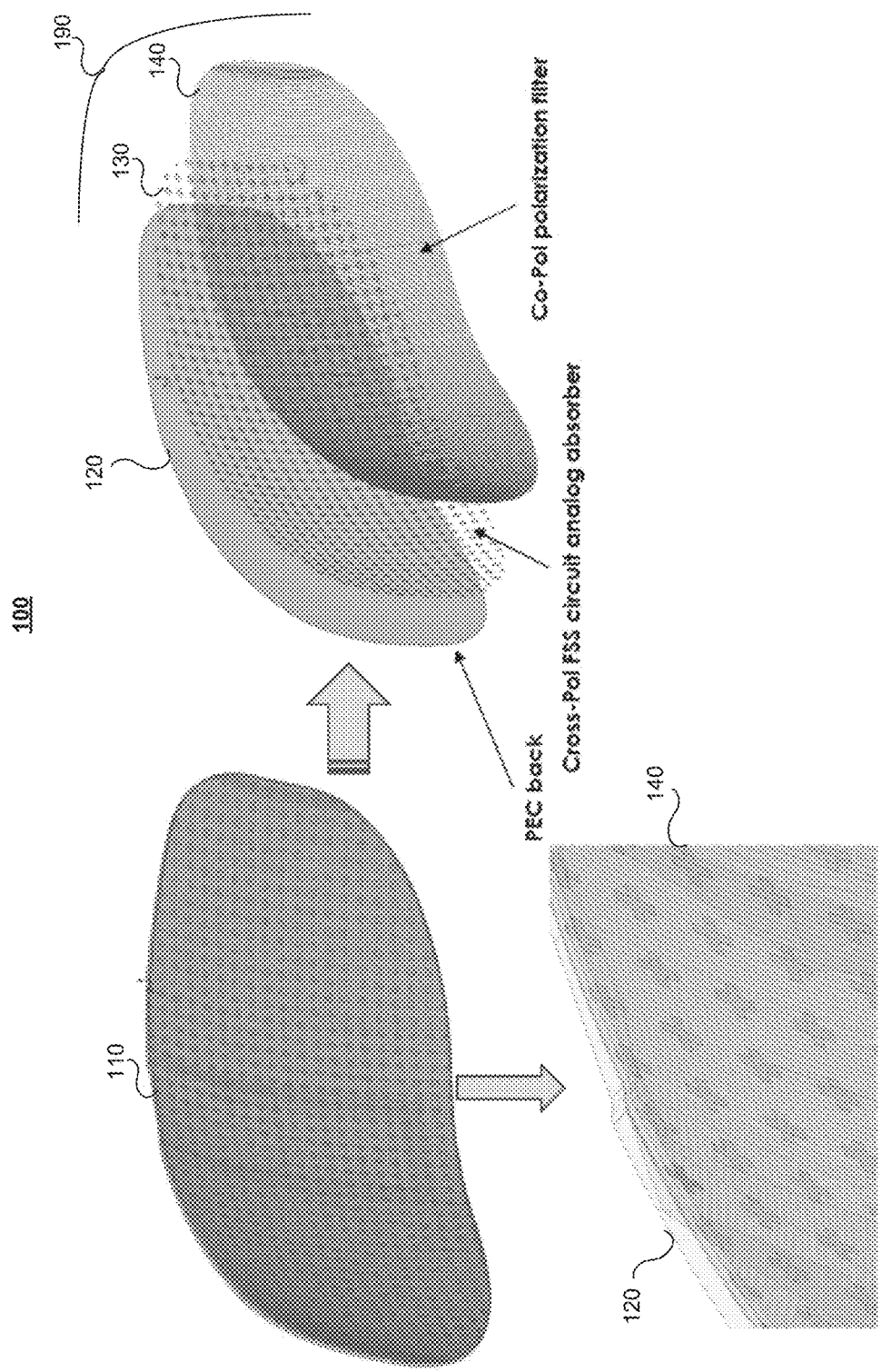
FIG. 1A depicts a diagram of a polarization selective antenna reflector, in accordance with some example embodiments.

Radar and communications systems rely on antennas to transmit and receive electromagnetic signals. A communications antenna may be used to transmit electromagnetic waves corresponding to a transmit signal, to receive electromagnetic waves corresponding to a signal transmitted from a distant transmitter or may be used for both transmission and reception. A transmitted signal may be separated from a received signal by time, frequency, pseudorandom code (PN code), and/or space. Generally, a transmitted signal must be separated from a received signal to prevent the transmitted signal from interfering with the much weaker received signal. With radar, a transmitted signal is sent out from the antenna, propagates to one or more targets from which the transmitted electromagnetic waves incident on the target are reflected and propagate back to the same antenna that transmitted to signal but at a later time that is proportional to the distance between the antenna and the radar target. The antenna receives the reflected signal and processes it to produce radar data including the distance and position of radar targets.

One of the challenges in both communications systems and radar systems is selecting and detecting the correct signals. For example, the correct signals have a known frequency, may occur at a known time, may arrive at the antenna from a known direction, and/or may have a known polarization. Selecting and detecting the right signals and rejecting other signals greatly improves performance.

Disclosed are devices and methods for selecting, at an antenna reflector, electromagnetic waves with a certain polarization and frequency and rejecting electromagnetic waves with different polarizations and/or frequencies. In one aspect, a directional antenna includes a shaped reflector surface with a series of conforming layers attached to the surface. The layers include a reflecting layer that causes reflection of electromagnetic waves at a specific frequency and polarization. Underneath the reflecting layer is a resistive frequency selective surface (FSS) layer. The resistive FSS layer absorbs cross-polarization electromagnetic energy at the same frequency as the co-polarization field reflected from the reflecting layer (also referred to herein as a grid surface). The resistive FSS layer may absorb electromagnetic waves at other frequencies outside an operating bandwidth. Incident electromagnetic waves in the radar bandwidth includes both a cross-polarized component and a co-polarized component. The co-polarized component is reflected off the grid surface. The cross-polarized component is transmitted through the grid surface and interacts with the resistive FSS layer and dielectric layers such that there is an impedance match to free space and dissipation of the cross-polarized energy. Underneath the resistive FSS layer is a conductive layer.

Radar performance may be increased by increasing the radar sensitivity and by reducing false alarms. False alarms correspond to targets that are incorrectly generated and displayed without a corresponding actual physical target. False alarms may occur in applications such as applications for the detection and tracking of moving or stationary objects and targets on the ground.

Disclosed herein is a cross-polarization filter that, among other benefits, reduces false alarms due to the cross-polarization component of a radar signal. The filter can be retrofitted to existing and deployed radars by attaching the filter to the reflector.

The following is a specific illustrative example of the disclosed subject matter. Other embodiments may include a different type of antenna or different shaped reflector. In this example, an antenna assembly includes an offset feed and a parabolic reflector with multiple layers that collectively reflect a desired frequency and polarization and absorb undesired frequencies and polarizations. An offset feed relative to the reflector may cause the generation of, or sensitivity to, cross-polarized waves in the transmit/receive (Tx/Rx) beams. Cross-polarization refers to electromagnetic waves with at least some portion having a polarization that is 90 degrees from the desired polarization. Electromagnetic waves that are aligned in polarization with the desired polarization are referred to as co-polarized. The cross-polarized waves can cause false alarms and a false alarm rate that is above the minimum acceptable for the radar system. The disclosed cross-polarization filter removes the cross-polarized component and thereby reduces the false alarm rate of the radar system.

FIG. 1A depicts a diagram showing a polarization selective antenna reflector 100 including reflector 110 and conformal layers 190 including conducting layer 120, resistive FSS layer 130 (also referred herein as an absorbing layer), and co-polarization reflecting layer 140 (also referred to as reflecting layer 140). As used herein, a cross-polarization filter includes resistive FSS layer 130, and a reflecting layer 140.

Figure 1B:
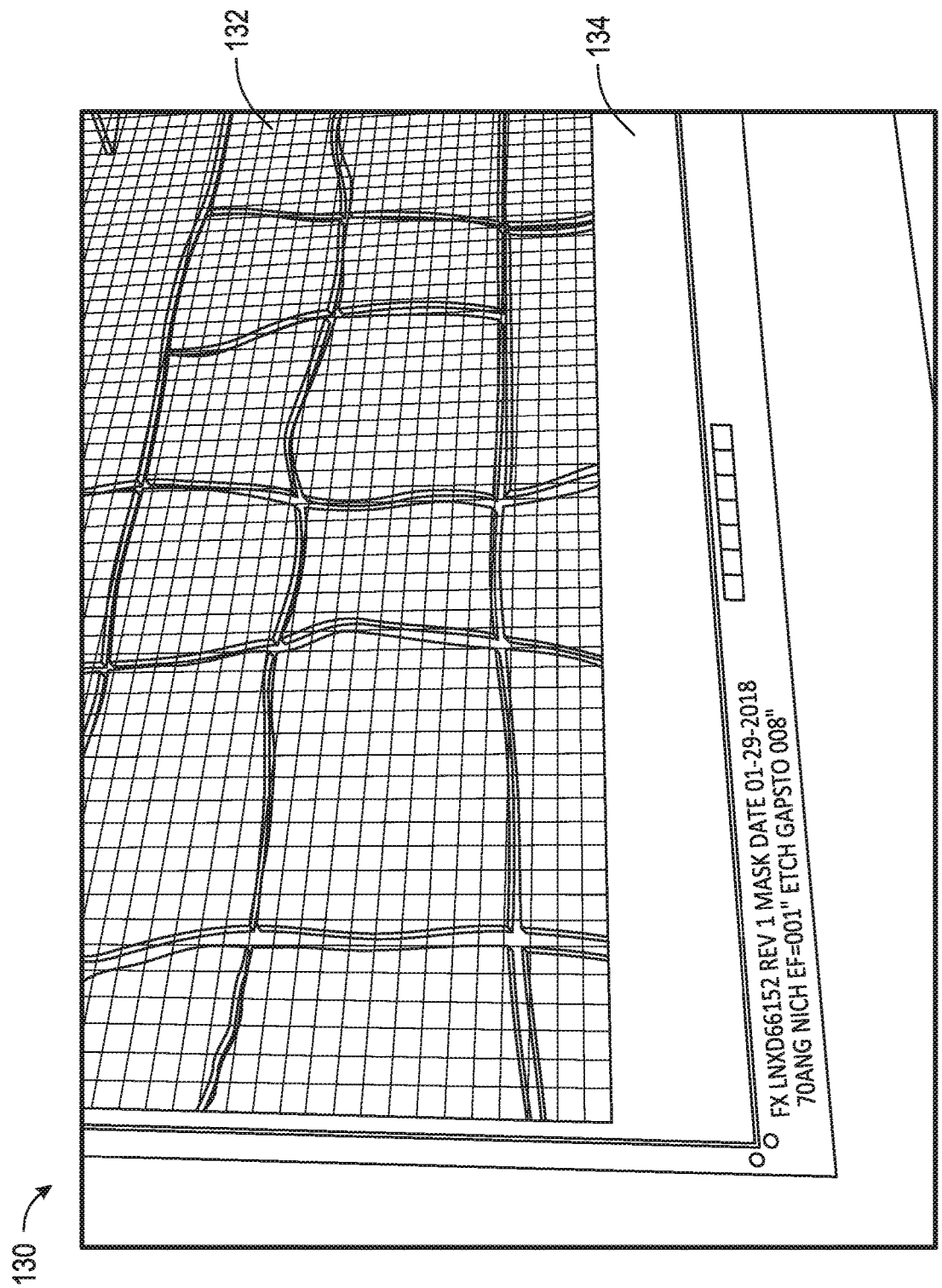
FIG. 1B depicts a resistive patterned conductive layer on a dielectric, in accordance with some example embodiments.

As shown in FIGS. 1A and 1B, the resistive FSS layer 130 may include a patterned conductive layer 132 on a dielectric 134. FIG. 1B depicts a resistive patterned layer on dielectric that dissipates electromagnetic energy from the cross-polarization field. For example, the resistive FSS layer may include a patterned resistive film such as a nickel chromium (NiCr) with a sheet resistance of 104 Ohms/sq NiCr film on a 3 mil thick (1 mil=1/1000th of an inch) Kapton or another dielectric. The resistive layer may be etched into a square patterned array, or another shaped array. The resistive film and dielectric may be embedded into a composite material such as a quartz/cyanate ester composite.

Figure 1C:
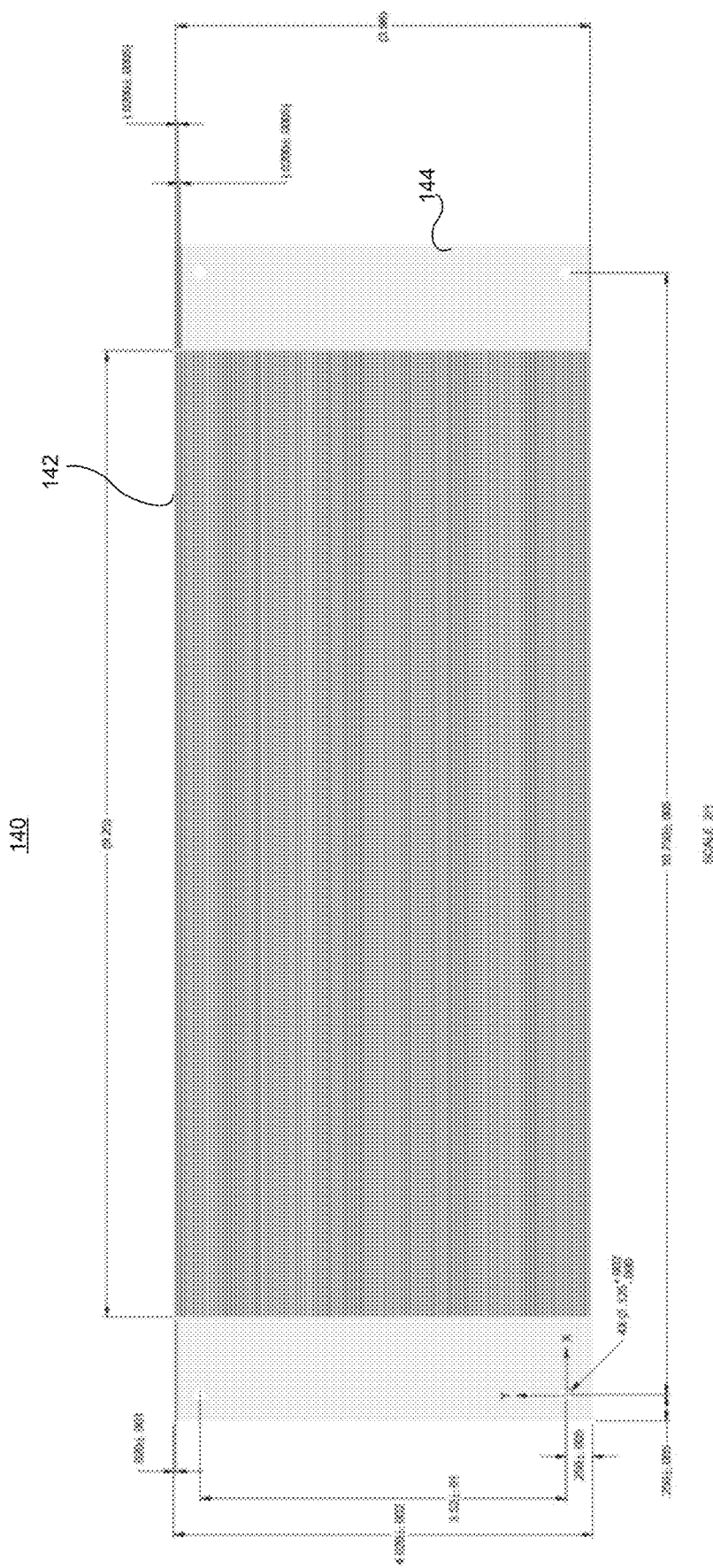
FIG. 1C depicts a patterned conductive grid layer on a dielectric, in accordance with some example embodiments.

As shown in FIGS. 1A and 1C, the reflecting layer 140 may include another patterned conductive layer 142 on a dielectric 144. FIG. 1C depicts a patterned conductive grid layer on dielectric that reflects the co-polarized field from the surface. For example, the reflecting layer 140 may include patterned lines of conductive material such as NiCr lines with a 20 mil width that are spaced 20 mils apart on a 0.5 mil Kapton dielectric to reflect the co-polarized electromagnetic waves.

The cross-polarization filter may be attached to a dish such as dish 120. For example, the filter may be attached via bonding or mechanical fasteners. In some example embodiments, the dish may be made of a conductive material, a carbon fiber material with an added conductive layer, or other material and may serve as a conducting backplane to form an absorbing composite with NiCr for the cross-polarization energy.

In some example embodiments, a carbon fiber dish and absorbing layer including the NiCr patterned film on Kapton creates an equivalent resistor-inductor-capacitor circuit (RLC-circuit) at the NiCr film interfaces which may be referred to as a circuit-analog-absorber (CAA). In some example embodiments such as the example described above, the reflecting layer to reflect co-polarized waves may be placed in front of the absorbing layer where the absorbing layer and dish provide rigid mechanical support. The co-polarized waves are reflected back while the cross-polarized waves pass through the reflecting layer and are absorbed by the absorbing layer. A quarter wave transformer may be included between the NiCr interface and the reflecting layer. An example of an advantage of the foregoing stack-up of layers is that a single dielectric (e.g., quartz/cyanate ester, etc.) can be used for mechanical rigidity which also has a good coefficient of thermal expansion and the desired electrical performance including impedance transformation properties.

Figure 1D:
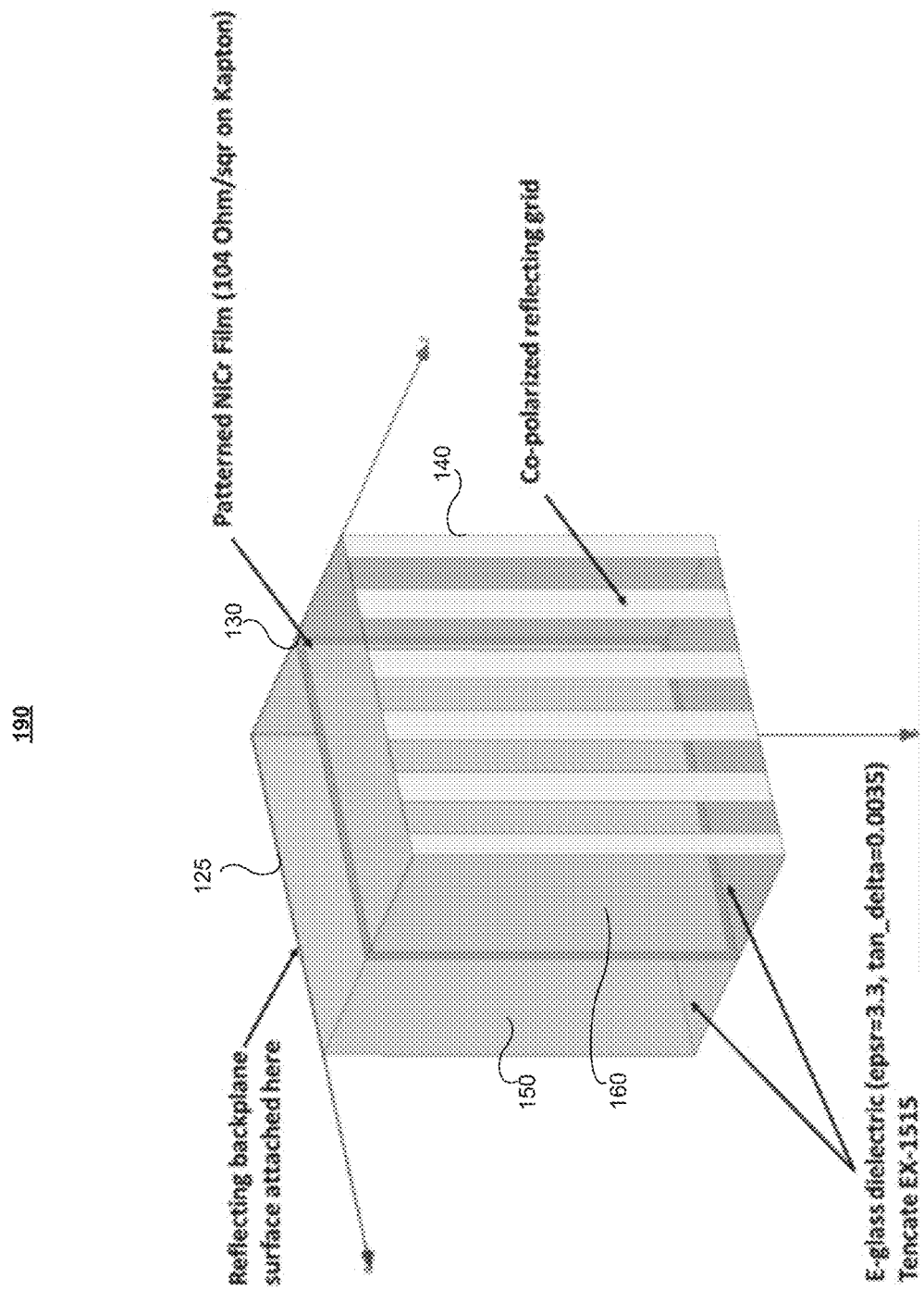
FIG. 1D depicts a stack-up of layers, in accordance with some example embodiments.

FIG. 1D depicts a stack-up of layers 190 including the reflecting layer 140 and the resistive FSS layer 130 with a dielectric layer 160 between the reflecting layer 140 and the resistive FSS layer 130, and another dielectric layer 150 between the resistive FSS layer 130 and the conductive layer 125. The stack-up of layers may be referred to as a laminate which includes the two dielectric layers 150 and 160, reflective layer 140, and resistive FSS layer 130. The dielectric layers 150 and 160 may have two different thicknesses and/or made from different dielectric materials. For example, dielectric layer 150 may be about 2.0 millimeters (mm) thick and dielectric layer 160 may be about 2.5 mm. The resistive FSS layer 130 may be bonded to the dielectric layer 150 and the dielectric layer 160 later bonded to the resistive FSS layer 130 side of the 130/150 combination, or the dielectric layer 160 may be bonded to the resistive FSS layer 130 and the dielectric layer 150 later bonded to the resistive FSS layer 130 side of the 130/160 combination. In some example embodiments, the laminate structure has a relative dielectric constant ($\varepsilon_r$) of about 3.3 and a loss tangent ($\delta_d$) of 0.0035. Other materials with different dielectric constants and/or loss tangents may also be used. In some example embodiments, the laminate may include Tencate EX-1515 as the composite resin system used for the dielectric layers 150 and 160.

Figure 2:
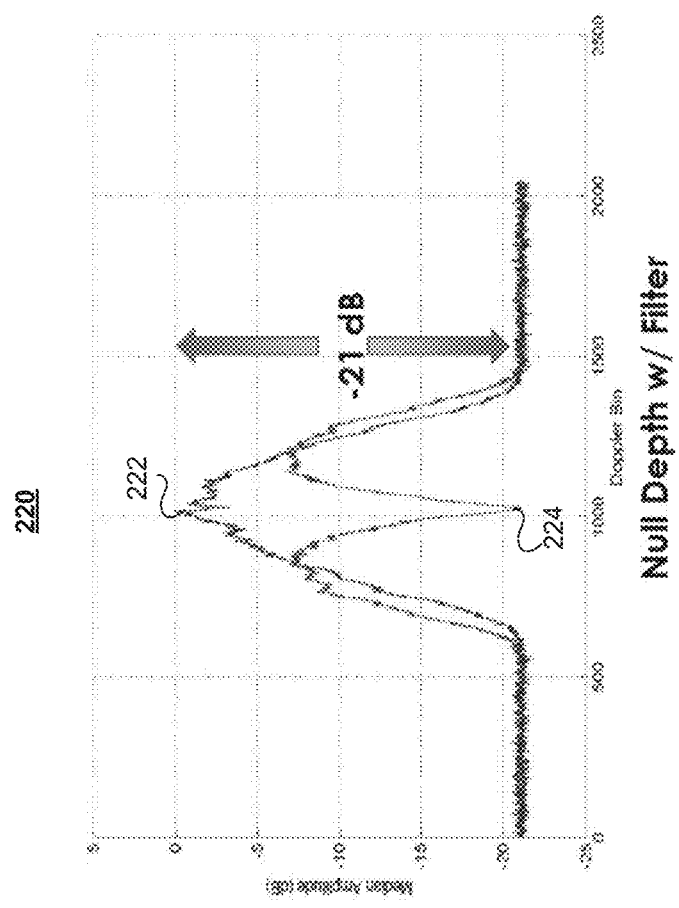
FIG. 2 depicts examples of plots of signal strength for monopulse sum and difference signals for antenna reflectors with and without a cross-polarization filter, in accordance with some example embodiments.
Figure 2:
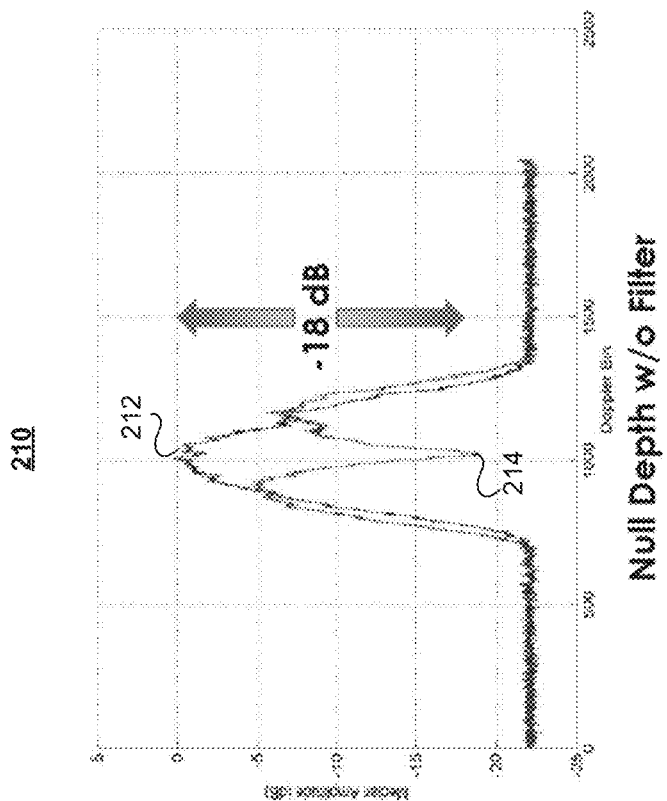

FIG. 2 depicts examples of plots of signal strength for monopulse sum and difference signals for antenna reflectors with and without a cross-polarization filter, in accordance with some example embodiments. Shown at 210 is an example of a plot of amplitude in decibels (dB) as a function of Doppler bin. The plot at 212 shows the sum channel and 214 shows the difference channel for an antenna without the cross-polarization filter. The difference between the peak of the sum channel and the null of the difference channel is about 18 dB. Shown at 220 is an example of a plot of amplitude in dB as a function of Doppler bin for an antenna with a cross-polarization filter. The plot at 222 shows the sum channel and 224 shows the difference channel. The difference between the peak of the sum channel and the null of the difference channel is about 21 dB. In this example, the difference between the peak of the sum and the depth of the null in the difference channel is about 3 dB. Accordingly, the cross-polarization filter provides a 3 dB larger difference between the sum and difference channels and results in fewer false alarms in the radar system.

Figure 3A:
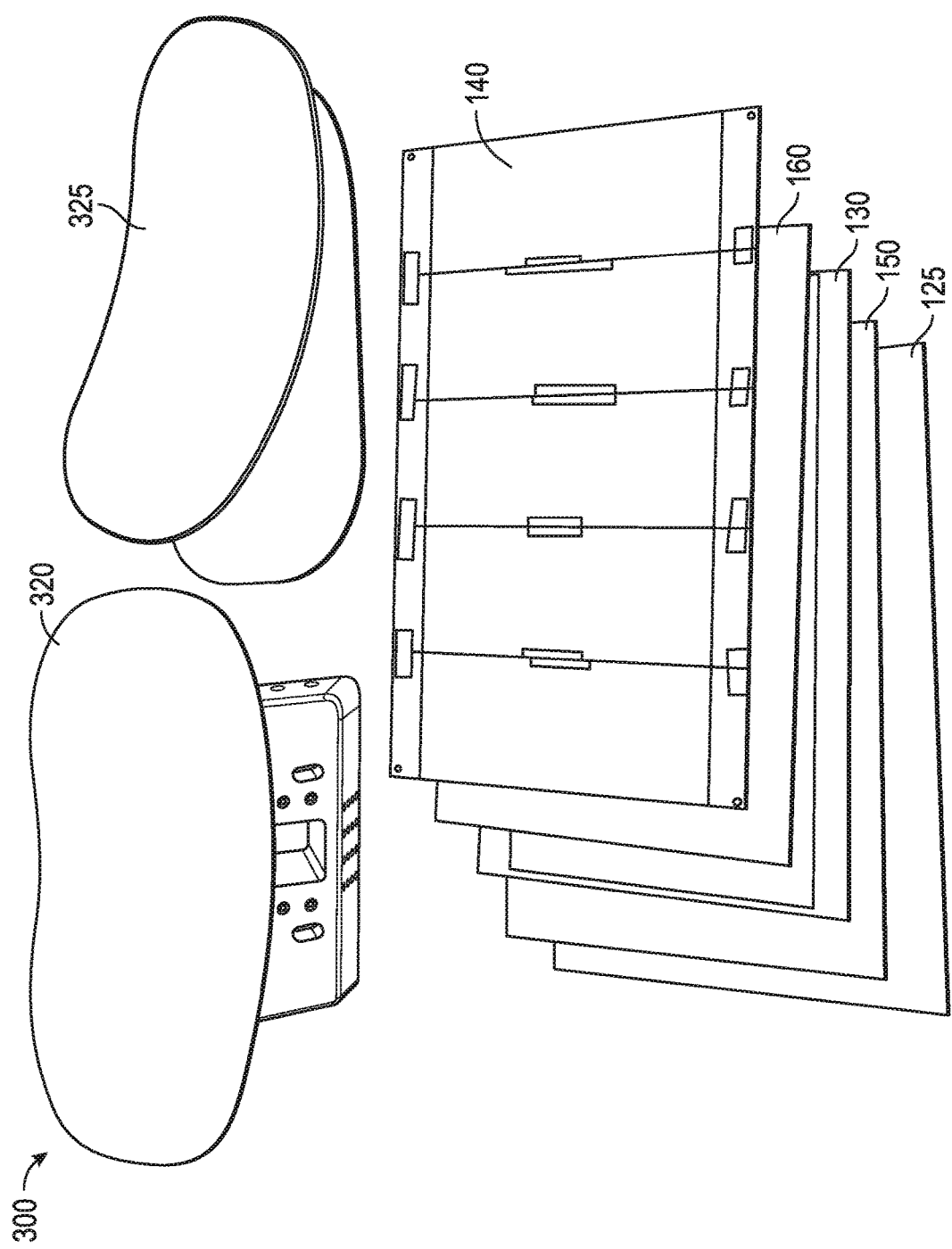
FIG. 3A depicts an example of a stack-up of layers and an example of a parabolic dish reflector, in accordance with some example embodiments.

FIG. 3A depicts an example of a stack-up of layers and an example of a parabolic dish reflector, in accordance with some example embodiments. Parabolic dish 320 may be made of a carbon fiber material. The example of parabolic dish 320 has a particular shape and aspect ratio but may have other shapes and/or aspect ratios. Conformal to, and attached to, the parabolic dish 320 may be stack-up of layers 190. Stack-up of layers 190 may include conductive layer 125 which may be a metal sheet or other conductive material. In some example embodiments, conductive layer 125 may be formed or shaped to fit as a conformal layer to the curved surface of parabolic dish 320. In other example embodiments, the parabolic dish may be made of a metal or conductive material and a separate conductive layer 125 is not used. The stack-up of layers 190 may include the following layers in order moving from the conductive layer 125 out away from the parabolic dish 320: first dielectric layer 150, resistive FSS layer 130, second dielectric layer 160, and reflecting layer 140.

Figure 3B:
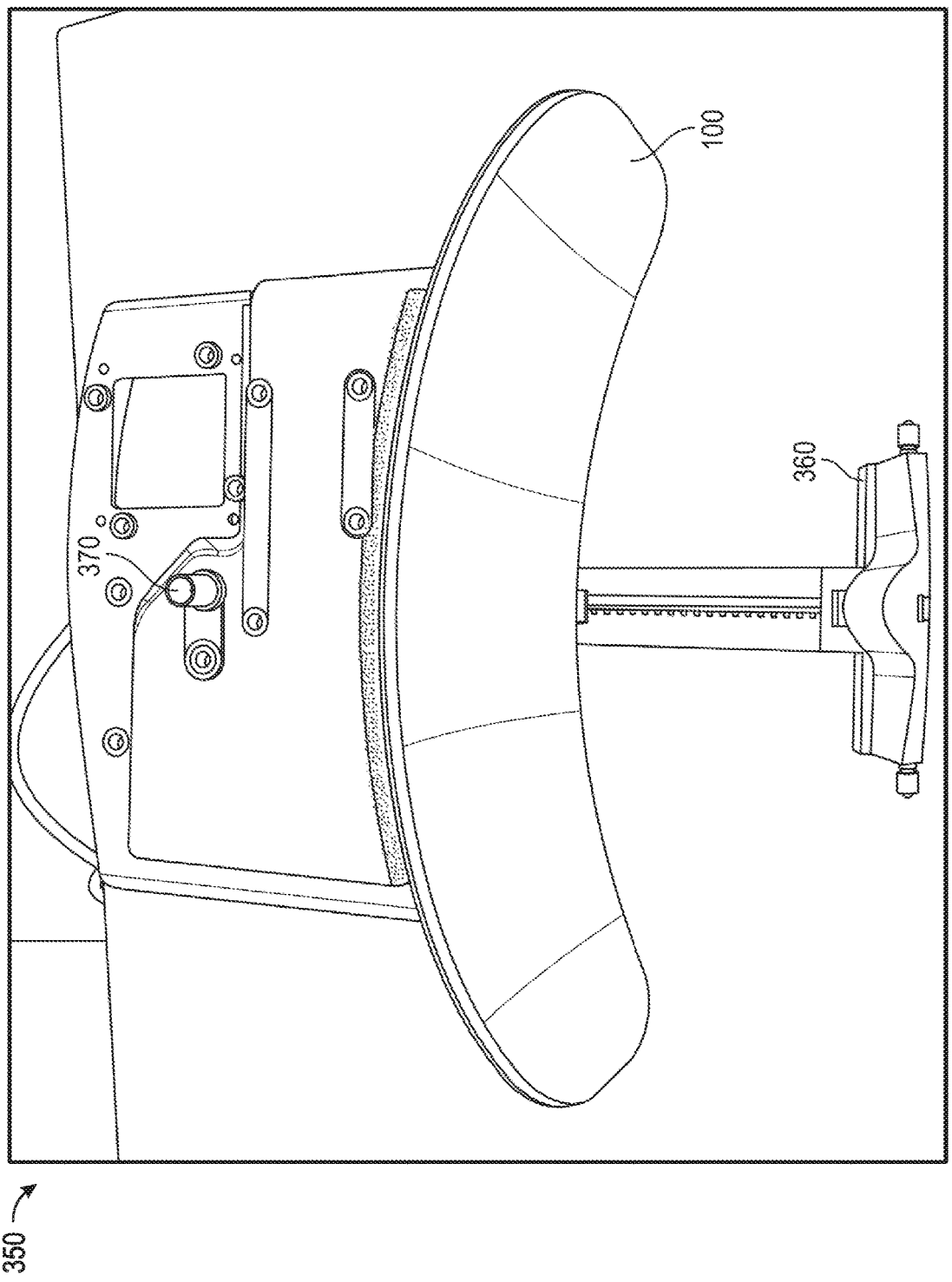
FIG. 3B depicts a radar antenna, in accordance with some example embodiments.

FIG. 3B depicts an example of a radar antenna 350, in accordance with some example embodiments. Radar antenna 350 includes polarization selective antenna reflector 100, feed horn 360, and one or more electrical inputs/outputs 370. Feed horn 360 may provide monopulse inputs/outputs including a sum and difference signals.

Figure 4:
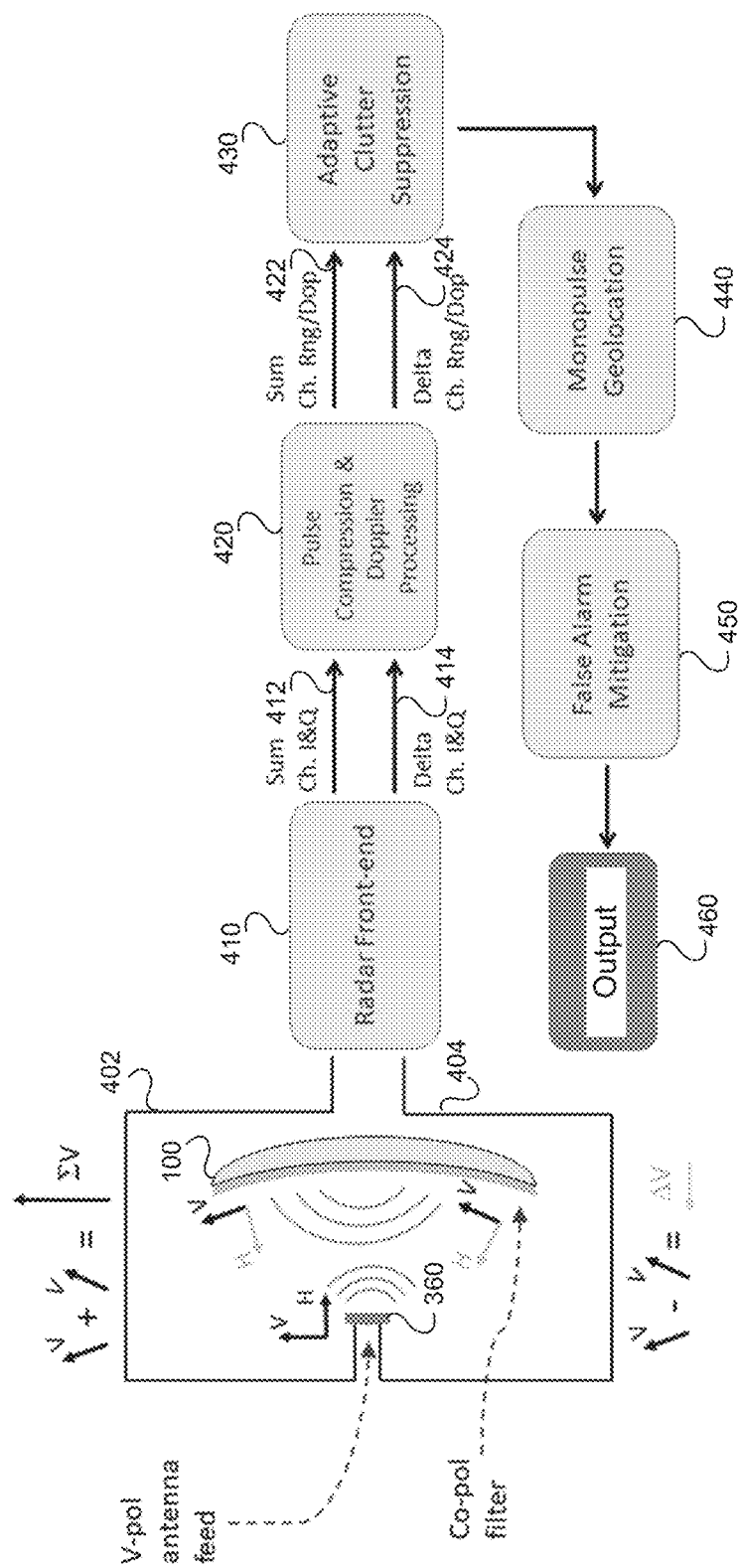
FIG. 4 depicts a diagram of a radar apparatus, in accordance with some example embodiments.

FIG. 4 depicts a diagram of a radar apparatus 400, in accordance with some example embodiments. Radar apparatus 400 includes polarization selective antenna reflector 100, feed horn 360, radar front end 410, pulse compression and Doppler processing 420, adaptive clutter suppression 430, monopulse geolocation 440, false alarm mitigation 440, and input/output which may conform with an industry or government standard.

Radar apparatus 400 includes polarization selective antenna reflector 100 as described above. Feed horn 360 may provide a sum channel 402 and a difference channel 404 as inputs/outputs to/from the antenna. Radar front end 410 may perform upconversion/downconversion, filtering, isolation, amplification, modulation/demodulation, and other analog (or digital) signal processing functions. Radar front end 410 may provide a sum channel in-phase and quadrature signal 412 and a delta or difference in-phase and quadrature signal 414 to a pulse compression and Doppler processing block 420. Pulse compression and Doppler processing block 420 may provide a sum channel range and Doppler signal 422 and a delta channel range and Doppler signal 424 to adaptive clutter suppression block 430, followed by monopulse geolocation 440, false alarm mitigation 450, and input/output 460.

Figure 5:
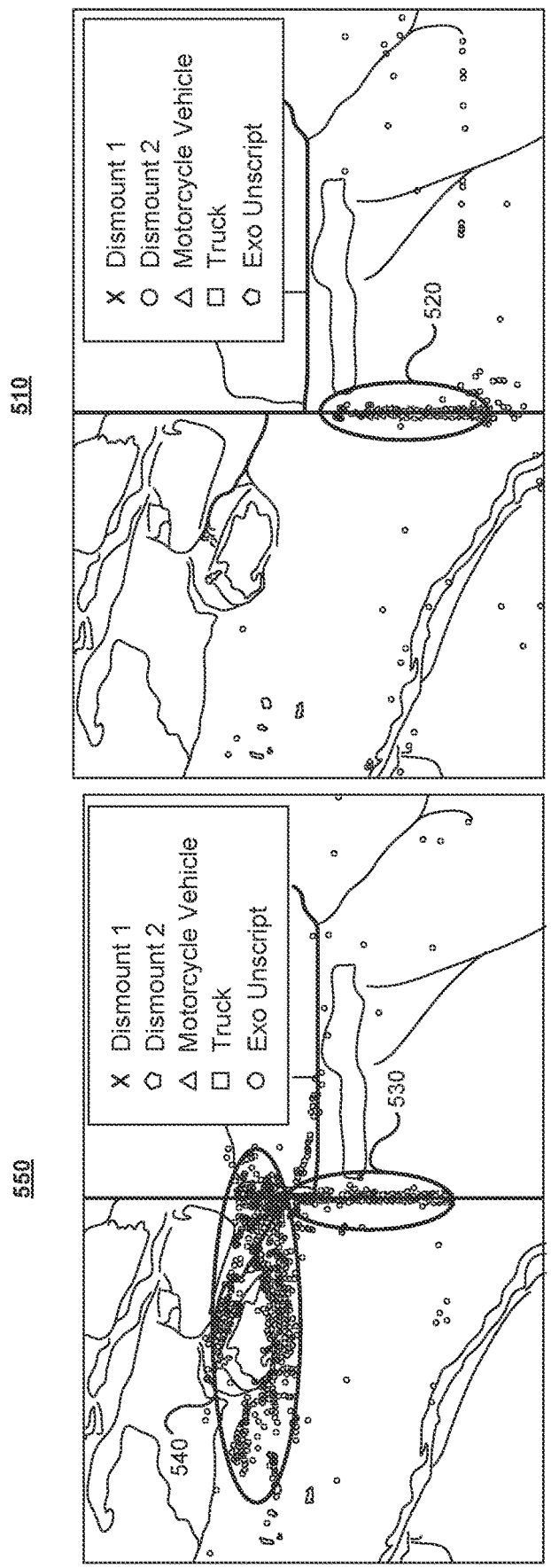
FIG. 5 depicts examples of radar results with and without a polarization selective antenna filter, in accordance with some example embodiments.

FIG. 5 depicts examples of radar results with and without the polarization selective antenna filter, in accordance with some example embodiments. At 510 is an image showing an aerial view of an area scanned by a radar that includes the foregoing polarization selective antenna filter. The area has actual targets such as motorcycles, dismounted personnel on foot, and trucks. As shown at 520, the radar detects the actual targets (shown as "Xs") but also generates some false alarms (shown as "Os"). At 550 is an image showing an aerial view of the same area as shown in 510 this time scanned by a radar that does not include the polarization selective antenna filter. The area has the same actual targets at the same locations as the image at 510. As shown in the image, the radar detects the actual targets (shown as "Xs") and also generates a larger number of false alarms (shown as "Os") including area 540 where there are no actual targets and there are many false alarms. The images at 510 and 550 show a reduction of false alarms using the disclosed polarization selective antenna filter compared to not using the polarization selective filter.

Figure 6:
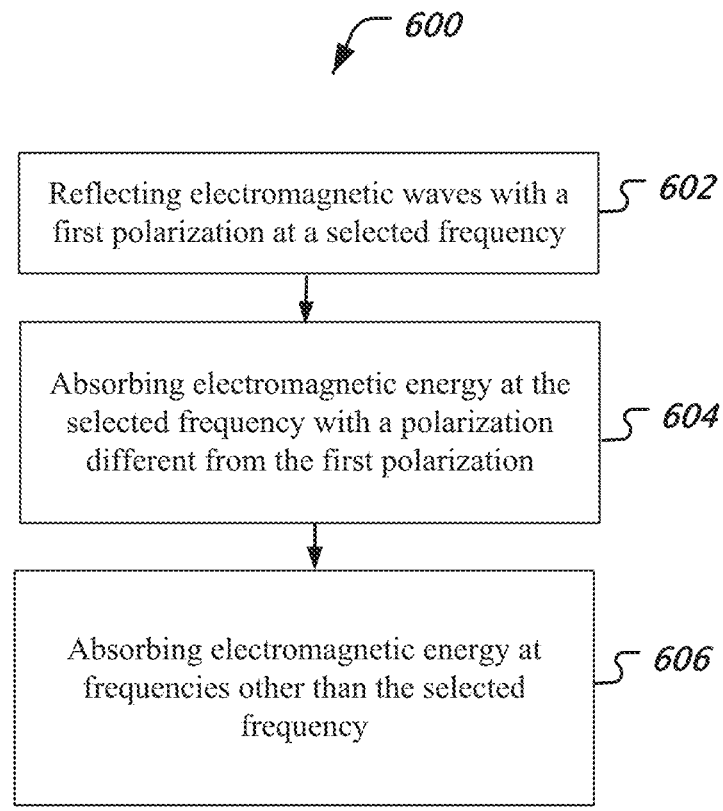
FIG. 6 depicts an example of a process, in accordance with some example embodiments.

FIG. 6 depicts a process for filtering electromagnetic signals, in accordance with some example embodiments. At 602, the process includes reflecting electromagnetic waves with a first polarization at a selected frequency. At 604, the process includes absorbing electromagnetic energy at the selected frequency with a polarization different from the first polarization. At 606, the process includes absorbing electromagnetic energy at frequencies other than the selected frequency.

The reflecting may be performed by a reflecting layer such as reflecting layer 140 detailed above including a patterned conductive layer and thin dielectric such as Kapton. The absorbing the electromagnetic energy at the selected frequency with a polarization different from the first polarization and the absorbing the electromagnetic energy at frequencies other than the selected frequency may be performed by an absorbing layer such as resistive FSS layer 130 detailed above.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described and other implementations, enhancements and variations can be made based on what is described and illustrated in this patent document.

What is claimed is:

1. A polarization selective antenna reflector apparatus, comprising:
   a reflecting layer structured to reflect incident electromagnetic waves with a first polarization at a selected frequency;
   an absorbing layer structured to form a frequency selective surface to absorb electromagnetic energy at the selected frequency that passes through the reflecting layer with polarizations different from the first polarization; and
   a conducting layer structured to form a shape, wherein the absorbing layer and the reflecting layer conform to the shape,
   wherein the absorbing layer, the conducting layer and the reflecting layer are stacked over one another and to conform to one another in size and shape to form a stack of conforming layers.

2. The apparatus of claim 1, wherein the reflecting layer comprises a metal layer formed into a first pattern selected to reflect electromagnetic waves with the first polarization at the selected frequency.

3. The apparatus of claim 1, further comprising first and second dielectric layers as part of the stack of conforming layers,
   wherein:
   the first dielectric layer is located between, and is structured to conform to, the reflecting layer and the absorbing layer;
   the second dielectric layer is located between, and is structured to conform to, the absorbing layer and the conducting layer; and
   the first and second dielectric layers differ in thickness or material.

4. The apparatus of claim 1, wherein the shape is parabolic in two dimensions.

5. The apparatus of claim 1, wherein the reflecting layer includes patterned conductive lines that reflect the incident electromagnetic waves in the first polarization.

6. The apparatus of claim 5, wherein patterned conductive lines of the reflecting layer include nickel chromium.

7. The apparatus of claim 1, further comprising:
   a first dielectric layer lies between, and is structured to conform to, the reflecting layer and the absorbing layer.

8. The apparatus of claim 7, further comprising:
   a second dielectric layer lies between, and is structured to conform to, the absorbing layer and the conducting layer.

9. The apparatus of claim 8, wherein the first dielectric layer and the second dielectric layer include Tencate EX-1515 and the reflecting layer includes nickel chromium.

10. The apparatus of claim 1, wherein the absorbing layer is structured so that the frequency selective surface comprises a dielectric layer and a patterned conductive layer formed on the dielectric layer, and wherein the patterned conductive layer is adjacent to the reflecting layer and the dielectric layer is adjacent to the conducting layer.

11. The apparatus of claim 10, wherein the patterned conductive layer incudes a patterned nickel chromium layer and the dielectric layer incudes a polyimide such as Kapton.

12. The apparatus of claim 10, wherein the patterned conductive layer and the dielectric layer are embedded in a composite material.

13. A radar antenna apparatus, comprising:
   a radar antenna that includes a plurality of antenna layers that are stacked over one another and to conform to one another, wherein the antenna layers include
   a reflecting layer structured to reflect electromagnetic waves received from a radar target having a first polarization at a selected frequency;
   an absorbing layer structured to form a frequency selective surface to absorb electromagnetic waves at the selected frequency that pass through the reflecting layer; and
   a conductive layer with a shape, wherein the reflecting layer and the absorbing layer conform to the size and shape of the conductive layer to form a stack of conforming layers; and
   a feed horn positioned relative to the radar antenna to supply a transmit signal to the radar antenna that is transmitted toward the radar target and to receive a receive signal that is first reflected from the radar target to the radar antenna and is further reflected by the radar antenna to the feed horn.

14. The apparatus of claim 13, wherein the reflecting layer comprises a metal layer formed into a first pattern selected to reflect electromagnetic waves with the first polarization at the selected frequency.

15. The apparatus of claim 13, wherein the absorbing layer is a frequency selective surface configured to absorb electromagnetic waves at frequencies different from the selected frequency.

16. The apparatus of claim 13, wherein the shape is parabolic in two dimensions.

17. The apparatus of claim 13, wherein the reflecting layer includes patterned conductive lines that reflect the incident electromagnetic waves in the first polarization.

18. The apparatus of claim 13, further comprising first and second dielectric layers as part of the stack of conforming layers,
   wherein:
   the first dielectric layer is located between, and is structured to conform to, the reflecting layer and the absorbing layer; and
   the second dielectric layer is located between, and is structured to conform to, the absorbing layer and the conducting layer.

19. The apparatus of claim 13, wherein the absorbing layer is structured so that the frequency selective surface comprises a dielectric layer and a patterned conductive layer formed on the dielectric layer, and wherein the patterned conductive layer is adjacent to the reflecting layer and the dielectric layer is adjacent to the conducting layer.

* * * * *